Patented Nov. 11, 1941

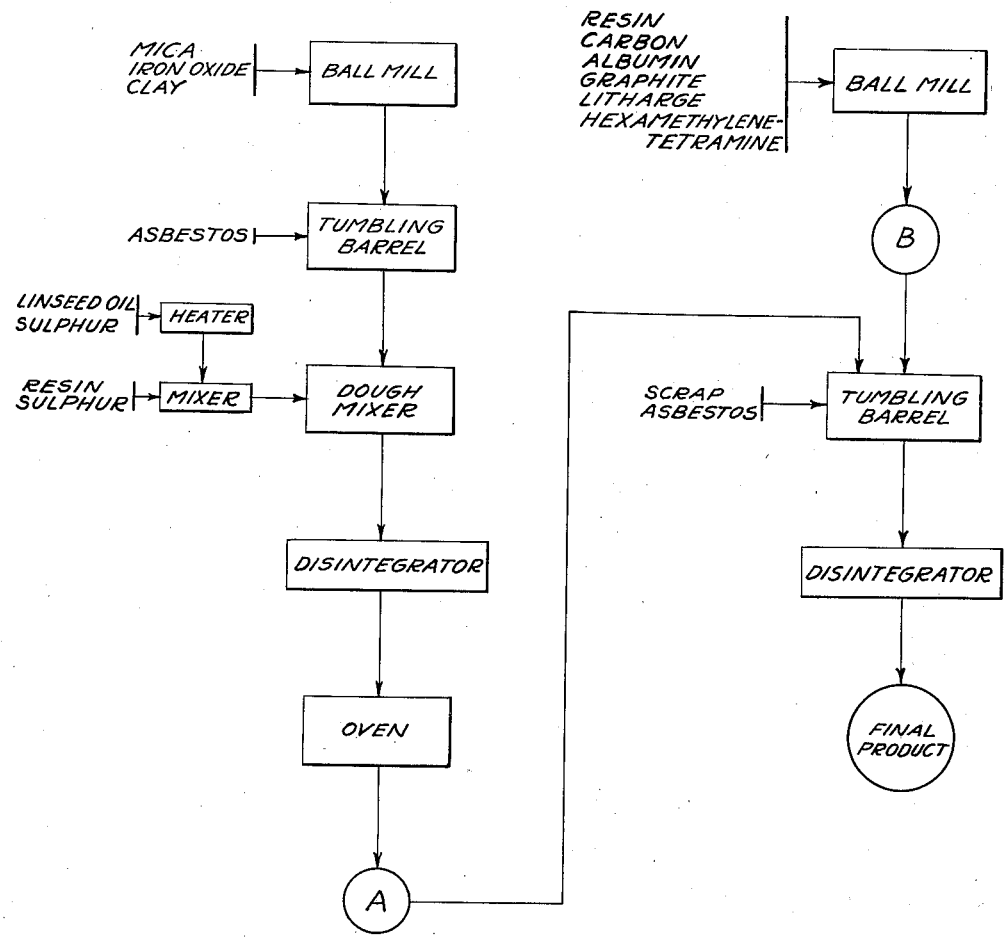

2,262,733

UNITED STATES PATENT OFFICE 2,262,733

PROCESS OF MAKING FRICTION MATERIAL

William Nanfeldt, Clifton, N. J., assignor to World Bestos Corp., Paterson, N. J., a corporation of New Jersey Original application July 2, 1936, Serial No. 88,613. Divided and this application February 21, 1939, Serial No. 257,664

8 Claims. (Cl. 260—7)

This invention relates to the manufacture of friction material. More particularly, the invention pertains to a molded friction material and a process for making the same having utility in connection with clutch facings, brake blocks, brake linings and miscellaneous other friction elements for mechanism.

Among the objects of the present invention is to provide an improved process for making brake lining which will enable the manufacture of lining to be completed within a short time interval after the mixing of the component ingredients. Another object is to provide a process which will reduce to a minimum the formation of surface fissures or cracks on the lining slabs during the intermediate steps of the process. Still another object is to provide a process for making brake lining which is susceptible to efficient control of the various reactions occurring during the treatment of the composite material, such as the degree of hardness, the resiliency of the product, the extent of hardening of the resinous ingredients, the degree of combination of the sulphur and linseed oil, and other reactions.

An object of the invention also is to provide a product which has a hardness not exceeding 3 Mohs. A further object is to provide a friction product which has uniformity of frictional coefficient for normal ranges of temperature as well as temperatures approximating 900° F. An object also is to provide a friction material having properties through which noise of operation is practically eliminated. Further objects of the invention relate to the high normal and shear resistance of the finished lining, to the employment of certain materials which will not materially modify under the influence of heat within the usual range of use, to the provision of materials in a brake lining having flat particle formation susceptible to breakage with sharp, jagged or conchoidal fracture, and other features such as will appear from consideration of the following description of my invention and the accompanying drawing.

In my co-pending application Serial No. 29,763, filed July 3, 1935, issued as Patent No. 2,155,020, I describe a molded friction lining of high utility, in the process of manufacture of which use is made of at least three compositions denoted as compositions A, B and C, composition B forming the framework of the brake lining and including materials giving a more or less rigid structure to the same; composition A being formed of materials which develop an efficient frictional coefficient and which are dispersed through the cellular construction of the B composition in spaced masses; and composition C being formed of materials suitable for forming a backing for the primary friction compositions A and B.

In the present application, which is a division of my co-pending application issued as Patent No. 2,175,480, I will describe a composition and the process for making the same, which in some respects is an improvement over the process and product described in my copending application Serial No. 29,763 and issued as Patent No. 2,155,020, above noted, giving a friction lining in which the frictional coefficient diminishes by less than 35% in the vicinity of 900° F. In the composition of this application, similarly I employ three compositions A, B and C, the function of each of these compositions being similar in function to that of the allied compositions in the co-pending application referred to, the composition A forming the primary friction material; composition B constituting the holding and framework material; and composition C forming the backing for the friction lining or material.

The composition which I denote as composition A, together with a permissible range of percentages and an example of preferred percentages, is as follows:

| Materials | Ranges | Example |
|---|---|---|
| | Percent | Percent |
| 2% blown sulphurized linseed oil | 5 to 18 | 14.28 |
| Liquid cresol resin | 2 to 18 | 8.79 |
| Sulphur | 1 to 3 | 2.20 |
| XX asbestos fibre | 45 to 65 | 60.45 |
| Albany slip clay | 5 to 15 | 9.88 |
| Iron oxide | 1 to 4 | 2.20 |
| 150 mesh powdered mica | 1 to 4 | 2.20 |

The 2% blown sulphurized linseed oil is a sulphur-linseed oil mixture made by mixing boiled, bodied or blown linseed oil with 2% of its weight of sulphur to a temperature of about 350° F. for a time period sufficient to cause the oil to take up and absorb the sulphur. By so treating the linseed oil, oxidation, together with the undesirable hardness resulting therefrom, is prevented.

The resin element of the composition is in the form of liquid cresol resin. I have found this form of resin to be desirable in the friction A composition since it reduces to some extent the resiliency of the composition and assists in the controlling of the reaction between the sulphur and the sulphurized linseed oil in the subsequent baking operation. This latter characteristic of the resin comes from the fact that the resin does not combine with sulphurized linseed oil, but on the contrary, tends to form an emulsion therewith, thus slowing down the reaction between the oil and sulphur. When heated over a sufficient length of time the cresol resin passes over into the infusible state where it has a Mohs' scale hardness of slightly less than 3.

The sulphur employed is the pure flowers of sulphur finely ground so as to readily combine with the linseed oil in the baking operation. The purpose of the sulphur is to form a compound with the linseed oil to prevent polymerization of the oil into a relatively hard material and to provide a resilient element in the friction substance, the compound having properties somewhat similar to that of rubber. I prefer to use Albany slip clay, but any other clay having particles with similar physical characteristics such as a plate-like and perforated formation and a hardness according to the Mohs' scale of approximately 2 may be employed. The function of the slip clay is to provide a filler which assists in controlling the resiliency and density of the A composition. The clay also has a lubricating nature and when mixed with sulphurized linseed oil it assists materially in the mixing operation of the A composition in the dough mixer.

I employ powdered mica which will pass through a 150 to the inch mesh, and the type known as amber mica or its equivalent is preferred. The purpose of the mica is to provide a composition material which is of plate-like particles and therefore resistant to pressure. The mica is formed in laminated sheets and is more or less brittle and when subjected to shearing pressure tends to delaminate, causing the frictional surface of the lining to shift and thereby assisting in the stabilization of the surface friction and tending to prevent glazing or polishing of the same.

Iron oxide is used in the A composition in the form of a fine powder having a low frictional value and a Mohs' scale hardness of around 2½. The characteristic action of the iron oxide particles is to assist in the control of the frictional value of the finished lining through the tendency of the particles to take on a polish under pressure.

The asbestos fibre is known in the trade as "double X" (XX) and consists of mine run asbestos having short fibres which has been treated in a rotary disintegrator to shred and separate the bundles of fibres. After such treatment it is found that the hardness is reduced to slightly less than 3 Mohs over the normal asbestos hardness ranging from 3 to 3½ Mohs. In this treatment also rock dust and other foreign matter is removed.

The composition which I denote as composition B, together with a permissible range of percentages and an example of preferred percentages, is as follows:

| Materials | Ranges | Example |
| --- | --- | --- |
|  | Percent | Percent |
| Powdered cresol resin | 15 to 30 | 27.21 |
| Hexamethylenetetramine | 1 to 3 | 1.36 |
| Carbon black | 0.5 to 3 | 1.36 |
| Graphite | 0.5 to 3 | .68 |
| Blood albumen | 1 to 6 | 5.44 |
| Shingle asbestos fibre | 38 to 50 | 44.90 |
| Fused and pulverized litharge | 1 to 10 | 5.44 |
| Scrap of final mixture | 1 to 15 | 13.61 |

As will be seen from this list, cresol resin is employed also in the B groups of materials but in powdered instead of liquid form. Asbestos is also employed but of a type known as shingle asbestos. This asbestos differs over the double X asbestos fibre in that it is obtained by treating long fibred asbestos in a disintegrator, a shaker and blower, and then subsequently re-run through the disintegrator to further break up the fibres so that the average fibre length of the re-ground fibre is approximately the same as the double X mine-run fibre, that is, approximately ⅜" or less. In addition to these two substances I employ, as appears from the above list, materials other than that used in the A composition.

Hexamethylenetetramine is used in small amounts to act as a catalyzer or hardener, this substance tending to hasten the polymerization of the cresol resin with heat. Carbon black has been found useful as a part of the brake lining structure as a controlling factor in the surface friction of the material. The carbon black is in the form of very small particles which spread about over the surface and tend to prevent or counteract glazing or other modification of the surface structure which will induce lack of stability in the fractional coefficient. The purpose of the graphite is to add a dry lubricating element to the friction lining.

The advantages of using metallic lead in a frictional surface such as a brake lining have been known for some time. However, the melting point of lead is around 621° F. and hence at the high temperatures now employed in heavy duty lining, amounting to points in excess of 800° F., the lead is melted and its function as a friction element under these high temperatures destroyed. I have found that by using litharge, which has a much higher melting point, I can make the lead arising from a decomposition of the litharge effective at these high brake lining temperatures. To accomplish this breakdown of the litharge I employ blood albumen, which has the property of combining with the oxygen of the litharge when mixed with ground and pulverized litharge and heated to a temperature approaching 800° F., at which temperature the albumen tends to decompose and combine with the oxygen and liberate free metallic lead. The lead liberated at these high temperatures has a stabilizing value on the friction since, with other properties, it shifts on the friction face, preventing a hard, smooth and carbonized surface from forming.

The albumen, in addition to combining with the litharge, tend to prevent the lining from being noisy when used in contact with brake drums. This is probably due to the fact that it does not melt to a fluid with heat but becomes slightly plastic and as the temperature rises eventually it passes over to a soft carbon residue which does not harm the frictional properties of the lining since its Mohs' scale hardness is around 2. A type or blood albumen which I found to be highly satisfactory for this use been analyzed to indicate the following composition:

| Components | Whole blood |
| --- | --- |
|  | Percent |
| Water | 80.890 |
| Total solid matter | 19.110 |
| Haemoglobin | 10.310 |
| Protein | 6.979 |
| Sugar | 0.071 |
| Cholesterin | 0.194 |
| Lecithin | 0.235 |
| Fat | 0.063 |
| Phosp. acid as nuclein | 0.0027 |
| Sodium oxide | 0.364 |
| Potassium oxide | 0.041 |
| Iron oxide | 0.054 |
| Calcium oxide | 0.008 |
| Magnesium oxide | 0.0036 |
| Chlorine | 0.308 |
| Phosphoric acid | 0.040 |
| Inorganic $P_2O_5$ | 0.017 |

The litharge used is made by heating ordinary litharge until it melts to a fluid, and after it has cooled and solidified, grinding and pulverizing the same so that it will pass through a 100 to the inch mesh screen. These litharge particles are similar to flat plates in structure with jagged edges which make them effective as a frictional component in the use of the lining at lower temperatures. These litharge particles differ over those of ordinary litharge, which are ball-like in shape and consequently have poor frictional qualities and attempt to weaken the lining structure.

The materials forming the C composition for backing the lining include the following, with range of percentages as well as a specific percentage example:

| Materials | Ranges | Example |
| --- | --- | --- |
|  | Percent | Percent |
| Powdered cresol resin | 18 to 28 | 24.00 |
| Carbon black | 0.25 to 3 | 1.00 |
| Shingle asbestos fibre | 50 to 70 | 69.00 |
| Scrap of final mixture | 1 to 10 | 6.00 |

It is noted that the various compositions are described each as a unit, the component materials forming 100%. In relation to the final composition, as for example, in the brake lining, the percentage of the group materials in a typical example may be varied within limits, such as 10% to 40% of the A group, 20% to 50% of the B group, and 5% to 30% of the C group. A typical percentage relationship is: group A—29.2%, group B—50.8%, and group C—20.0%. Further, as regards the individual materials entering into the completed composition or brake lining, the percentage ranges and a typical example follows:

| Materials | Ranges | Example |
| --- | --- | --- |
|  | Percent | Percent |
| 2% blown sulphurized linseed oil | 2 to 8 | 4.17 |
| Liquid cresol resin | 2 to 8 | 2.57 |
| Sulphur | 0.25 to 1 | .64 |
| XX asbestos fibre | 10 to 25 | 17.66 |
| Albany slip clay | 2 to 5 | 2.89 |
| Iron oxide | 0.25 to 1 | .64 |
| 150 mesh powdered amber mica | 0.25 to 1 | .64 |
| Powdered cresol resin | 15 to 20 | 18.62 |
| Hexamethylenetetramine | 0.25 to 1 | .70 |
| Carbon black | 0.25 to 1 | .90 |
| Graphite | 0.25 to 1 | .35 |
| Blood albumen | 1 to 4 | 2.76 |
| Shingle asbestos fibre | 30 to 40 | 36.60 |
| Fused and pulverized litharge | 1 to 5 | 2.76 |
| Scrap of final mixture | 1 to 10 | 8.10 |

In carrying out the process of making friction material from the substances mentioned and in accordance with the assemblage of these substances in groups A, B and C, the materials of each group are independently assembled and subsequently combined in a unified mass for treatment. In the case of the group A materials, the powdered mica, the iron oxide and the slip clay are mixed in a ball mill for about fifteen minutes or until a uniform mix of these constituents is obtained. A mill of this type is made by the Paul Abbe Company. Double X (XX) asbestos fibre, as previously described, is added to the mix from the ball mill and the assembled materials treated in a tumbling barrel for about one-half hour or until the non-fibrous filling material has been dispersed and distributed throughout the asbestos fibres. The contents of the tumbling barrel is then placed in a dough mixer such as that manufactured by Warner & Tfleiderer. To the dough mixer is added also the sulpherized linseed oil, liquid cresol resin and sulphur which previously has been stirred together cold in a pony mixer until the sulphur is finely distributed throughout the oil and resin. The dough mixer is operated for about one and one-quarter hours or until a uniform mix of small, ball-like particles ranging chiefly from 1/16" to 1/8" are formed.

This mix is then passed through a disintegrator such as that built by Christie & Norris Company, including a rotating drum with a corrugated lining and opposed vanes. By the action of this machine the lumps and clusters of fibres and other material which may have been formed in the dough mixer are broken up into small ball-like and usually semi-dry particles. The material is then placed in shallow pans and inserted in an oven where at a temperature of around 225° F. it is retained for a period of about three and one-half hours. This completes the preparation of the A composition and it is now in condition to be added to the B composition.

In preparing the B composition the non-fibrous material including the powdered cresol resin, the hexamethylenetetramine, carbon black, blood albumen, graphite and the fused and pulverized litharge are mixed together in the ball mill until uniformity of mix is obtained. The shingle asbestos fibre, as previously described, which has been properly cleaned, freed from rock dust, opened and fluffed, is then added to the non-fibrous material in a tumbling barrel which is tumbled and mixed for a period of approximately one-half hour or until the non-fibrous filling material has been thoroughly dispersed through the asbestos fibres. At this point, that is, after the mixing of the fibrous and non-fibrous stock in the tumbling barrel, the A composition mix is added together with scrap of the final product and the mixture of the A and B compositions are tumbled for about a half hour, after which they are removed from the barrel and passed through the disintegrator. The action of the disintegrator is to break up any large lumps or clusters of fibres which have been formed in the materials and obtain a more thorough mix of the two groups of substances. The product as obtained from the disintegrator and consisting of a mixture of groups A and B materials is the final mixture and includes all the materials that enter into the friction face of the completed lining. The accompanying drawing indicates in flow sheet form the process of making the final friction material as above described.

There remains to describe the preparation of the C composition mixture. A ball mill is utilized as the first operation in the treatment of the C composition materials, the non-fibrous substances, carbon black and the powdered cresol resin being introduced into this mill and thoroughly mixed. The resultant mixture, together with the shingle asbestos fibre and scrap of final mixture, is then introduced into a tumbling barrel where these materials are tumbled until a uniform mix is obtained and the non-fibrous materials distributed throughout the fibrous stock. The mixture is then passed through a disintegrator to break up clusters of fibres and balls of the substance, thus obtaining the final mix.

In describing the molding steps of the process the description will be limited to the formation of a brake lining. In carrying out this step of the process a preliminary flat sheet of the material is first obtained. Any suitable means for making this sheet may be used, but I prefer to employ a rectangular mold having a false or loose bottom and an open top in which a rectangular plunger surface may have movement to compress the material within the box. In carrying out the process a layer of the C composition is placed on the false bottom of the box where it is loosely and evenly distributed over the entire surface. The depth of the material of course will vary with the final thickness of the brake lining, the approximate thickness being one inch or 16 times the finished thickness of the C layer. Upon this C composition layer a predetermined amount of the mixed A and B compositions is evenly distributed to such a depth that the thickness of the A—B—C layer is approximately 15 times that of the molded segment. The plunger part of the mold is then put in place and the material pressed cold in a suitable press at about 125 pounds per square inch to a thickness approximately five times greater than the required thickness of the finished segments.

This preliminary sheet or slab of friction material does not have sufficient strength for handling but must be handled on suitable trays. In removing the compressed preliminary slab from the preliminary mold, the plunger and the side frame of the mold is lifted upward to free the top and bottom of the slab. A sheet of Cellophane about 0.001 inch thick is laid over the top of the preliminary sheet or slab and extended over the edges of the same about ½" or at least equal to twice the finished thickness of the slab. Upon this sheet of Cellophane is laid a flat sheet-metal plate which has the approximate length and width of the slab. With the sheet of Cellophane and the metal plate in place on top of the slab and the slab lying upon the false bottom of the mold, the whole unit is reversed so that the slab is now lying upon the sheet of Cellophane and the sheet-metal plate. The bottom part of the mold may then be removed and another sheet of Cellophane placed on the slab, this sheet, however, being of the same length and width as the slab. Upon this second sheet of Cellophane is laid another sheet-metal plate which has the same length and width as the bottom sheet-metal plate. The preliminary sheet or slab is now a unit which is ready for the heat treatment.

In carrying out the heat treating step of the process the preliminary slab, including the supporting metal and Cellophane sheets, is placed in the bottom of a heated single cavity plunger type mold which is slightly larger than the slab and is here subjected to pressure of about 800 pounds per square inch at a temperature of around 290° F. for about four minutes. During this operation under heat and pressure the fibres are compacted and the powdered cresol resin melts and flows around the fibres and non-fibrous material and starts to react and polymerize. The hexamethylenetetramine in the composition also melts and starts to combine with the cresol resin. This pressure of 800 pounds, however, is not sufficient to produce the maximum density desired and reduces the thickness of the material to a value at least 1.2 times greater than the thickness of the finished friction material. If maximum density were imparted at this step of the process it would be impossible to curve the sheet without cracking, even though the bond were still fluid or plastic. Another reason for not imparting maximum density to the heated slab is that blistering is apt to occur while removing the compressed sheet from the heated mold. It is highly important in this operation that the powdered cresol resin melt to a fluid before starting to polymerize and that the compressed composition slab is removed from the mold at the point where the cresol resin is melted to a fluid and just starts to polymerize. The compressed sheet and the supporting metal plates are removed from the mold while hot by admitting air under pressure to the bottom side of the bottom plate, this forcing the slab upwardly where it can be secured and removed. The sheet-metal plates are at once removed from the slab and the composition sheet is bent over a suitable mandrel having a desired curvature. This curved composition sheet is then quickly placed in a curved sheet-metal pan and the pan placed in a cold curved cavity mold where the sheet is allowed to cool while under a pressure of about 125 pounds per square inch. After this curved sheet is cold the preliminary treatment will have been completed and the sheet may be stored in this form or subjected to final treatment as desired.

The function of the Cellophane inserted between the preliminary slab and the metal plates is for preventing the preliminary slab from sticking to these plates and to make it possible to remove the plates from the hot compressed sheet rapidly. In addition, the Cellophane adheres to the slab itself and thereby assists in holding the material to a uniform arc in the bending operation and preventing cracking of the material.

The final treatment of the semi-cured slab consists in the complete cure of the material which is accomplished by placing the curved composition sheet in a curved sheet-metal pan and placing the pan in a curved cavity mold where, under a pressure of around 1500 pounds per square inch at a temperature of approximately 300° F. for a time period of about one hour, the maximum density is imparted to the sheet and the cresol resin passes over into the infusible state. In this pressure operation the Cellophane which still adheres to the curved sheet prevents sticking of the sheet to the metal pans. After removal from the curved mold the sheets are cooled and may be stored in stock for further processing in this slab form.

Proceeding with the operation, the curved sheet is cut into segments of the required widths by any suitable means and then ground on all sides to the required dimensions. The individual ground segments are then placed on trays or any suitable conveyor in an oven where they are baked for approximately two hours while heated at a temperature around 225° F. In this final baking operation the trapped gases are removed, the resinous bond in the B and C compositions is completely transformed to its infusible state and the sulphurized linseed oil in the A composition takes on its final resilient set. After the baking is completed the segments are removed from the oven and cooled, this completing the manufacture of the brake lining.

Instead of cutting the curved cured sheets into segments they may be ground on all sides and baked as in the case of the individual segments and furnished to the jobbing trade where dealers may cut various sizes of segments from the sheet or slab as desired.

The final friction lining as made by the above process consists of areas of rigid material derived from the B composition and intermediate areas of resilient material derived from the A composition, the B composition material serving as a framework for supporting the A composition material. The C composition in the final product has a thickness of approximately 1/16" but may vary from one-fifth to one-twelfth of the thickness of the finished lining, depending upon the lining thickness. For example, in a 3/16" lining the C composition is approximately one-fifth of the thickness.

Of the various materials employed in the friction lining as above described, as previously mentioned, each has its particular function in cooperating to make the brake lining effective. In general the different materials have a hardness of 3 Mohs or less, so that the composite hardness of the lining is 3 Mohs or less, and consequently it is impossible to scratch the metal surface of the cooperating brake drum which is made of cast iron or soft seel. The various particles for the most part have a flat, plate-like formation highly resistant to normal pressure but at the same time breaking down under shear pressure with jagged edges tending to resist side movement and thus intensify the frictional effect. The use of materials such as mica and carbon black serve to prevent glazing and unstable friction properties; the use of slip clay provides density factors as well as assists in the mixing process; the linseed oil in conjunction with the sulphur provides the resilient yielding factor to the brake lining surface; the litharge supplies an effective frictional element for high temperatures; the asbestos binds the various substances together throughout the temperature range of use; and the resin forms the base of a rigid framework or holding means for the primary friction substances. With these materials assembled according to my process I am able to manufacture a brake lining which maintains practical uniformity of the coefficient of friction up to temperatures around 400° F. and at 900° F. has diminished from this uniform value by less than 35%.

While I have specified certain materials as entering into this composition, it is of course apparent that equivalent substances may be substituted. For example, for the cresol resin may be substituted cresol formaldehyde resin, phenol furfural resins, other furfural resins or certain types of synthetic resins which will become infusible with heat and not exceed a hardness of 3 Mohs. Instead of blown, bodied or boiled linseed oil certain other vegetable oils such as China-wood oil, either alone or in combination, may be used, or a limited amount of rubber, to supply the resilient factor. Instead of carbon black other carbon sources such as coal tar coke might be employed. However, the particular elements forming the composition hereinabove described have been found to be superior in the relationships named.

I claim as my invention:

1. A process of making brake lining material which comprises heating linseed oil with about 2% by weight of sulphur, mixing the sulphurized linseed oil with cresol resin and additional sulphur, combining the resultant mixture with a base composition of mica, iron oxide and clay, oven-heating the resultant mix, adding the mix to another composition containing mixed powdered cresol resin, hexamethylenetetramine, carbon, albumen, graphite and litharge to form the final brake lining material.

2. A step in the process of making brake lining material containing asbestos fibre, litharge, albumen, liquid cresol resin, sulphur, and linseed oil which comprises mixing linseed oil and about 2% by weight of sulphur at a temperature of about 350° F. and then mixing the sulphurized linseed oil with the liquid cresol resin prior to addition to the other materials.

3. A process of making brake lining material which comprises heating linseed oil with about 2% by weight of sulphur, mixing the sulphurized linseed oil with cresol resin and additional sulphur, combining the resultant mixture with a base composition of mica, iron oxide, asbestos and clay, oven-heating the resultant mix to form a first composition, and adding the first composition to a second composition containing cresol resin, hexamethylenetetramine, carbon, albumen, graphite, asbestos and litharge to form the final brake lining material.

4. A process of making brake lining material which comprises mixing linseed oil with about 2% by weight of sulphur to form a sulphurized linseed oil, combining the resultant mixture with additional sulphur and a base composition of mica, iron oxide, asbestos and clay, oven-heating the resultant mix, and adding the mix to another composition containing litharge and friction materials to form the final brake lining.

5. A process of making brake lining material which comprises heating linseed oil with about 2% by weight of sulphur, mixing the sulphurized linseed oil with cresol resin and additional sulphur, combining the resultant mixture with a base composition including asbestos, oven-heating the resultant mix, and adding the mix to another composition containing litharge and additional friction materials to form the final brake lining material.

6. A process of making brake lining material which comprises heating linseed oil with about 2% by weight of sulphur to a temperature of about 350° F. for a time period sufficient to cause the oil to take up and absorb the sulphur, mixing the sulphurized linseed oil with liquid cresol resin and sulphur, combining the resultant mixture with a base composition of mica, iron oxide, clay and asbestos, breaking up the resultant mix into small particles, oven-heating the material, combining the oven-heated material with a mixture containing cresol resin, hexamethylenetetramine, carbon, albumen, graphite and litharge previously mixed with asbestos, and mixing and disintegrating the combined friction elements to form the final brake lining material.

7. A step in the process of making brake lining material containing asbestos fibre, litharge, albumen, liquid cresol resin, sulphur and linseed oil which comprises mixing linseed oil with about 2% by weight of sulphur at a temperature of around 350° F., mixing liquid cresol resin and sulphur at room temperature, and then combining and mixing the sulphurized oil and mixed resin and sulphur until the sulphur is finally distributed throughout the oil and resin.

8. A process of making brake lining material which comprises heating linseed oil with about 2% by weight of sulphur, mixing the sulphurized linseed oil with cresol resin and additional sulphur, combining the resultant mixture with a base composition of mica, iron oxide, asbestos and clay, oven-heating the resultant mix to form a first composition, preparing a mixture containing mixed powdered cresol resin, hexamethylenetetramine, carbon, albumen, graphite and litharge, combining the last named ingredients with asbestos to form a second composition, and finally intimately combining the two compositions to form the final brake lining material.

WILLIAM NANFELDT.